UNITED STATES PATENT OFFICE.

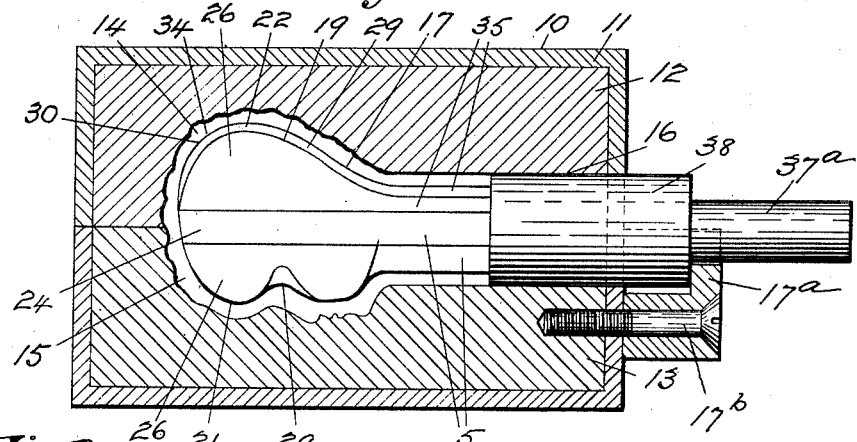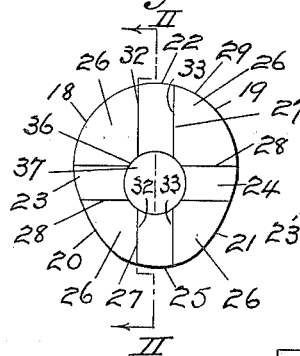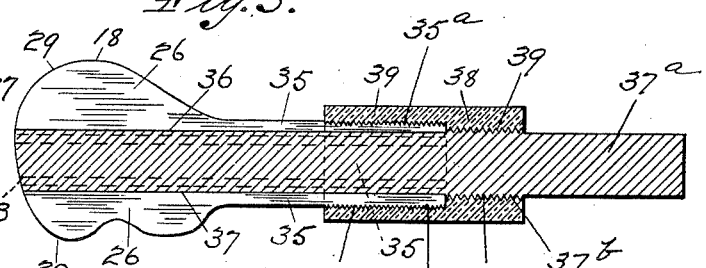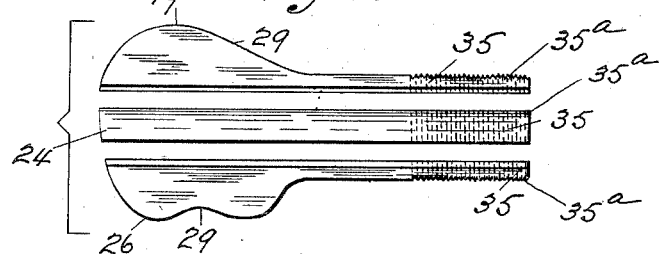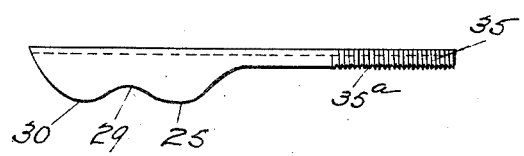

LOUIS LEVINE, OF NORTHPORT, NEW YORK, ASSIGNOR OF ONE-HALF TO JUDSON S. SNYDER, OF NORTHPORT, NEW YORK.

MOLD.

1,076,681.      Specification of Letters Patent.      Patented Oct. 28, 1913.

Application filed June 13, 1912. Serial No. 703,503.

*To all whom it may concern:*

Be it known that I, LOUIS LEVINE, a citizen of the United States, and a resident of Northport, county of Suffolk, and State of New York, have invented a certain new and useful Improvement in Molds, of which the following is a full, clear, and exact specification.

This invention relates to a class of devices adapted to be used for making hollow articles of manufacture from plastic material.

My invention has for its object primarily to provide a mold or device designed to be employed for making various articles, and especially the heads of dolls, from plastic material in a form so that the interior thereof will be hollow whereby it will be light in weight, and wherein is provided a die or shell composed of two mating members having the opposed surfaces thereof cut-out, or recessed in the form of the configuration of the article to be molded. By the use of a collapsible core which is also preferably of the shape of the article, and which consists of a plurality of segments, the plastic material is pressed between the core and the mating members when assembled so as to conform with the recesses thereof.

Another object of the invention is to provide a core-rod to support the segments when assembled for use in conjunction with the mating members of the die, and which is adapted to be adjusted so as to maintain a uniform thickness of the article to be molded; and a still another object of the invention is to provide means which serves to move the segments with relation to the core-rod as occasion requires.

A further object of the invention is to provide a simplified and efficient mold which is susceptible of being made in various forms so that it may be employed to make from plastic material various sizes and types of hollow articles.

A practical embodiment of the invention is represented in the accompanying drawing forming a part of this specification in which similar characters of reference indicate corresponding parts in all the views, the said invention being more fully described hereinafter and then pointed out in the appended claims.

In the drawing, Figure 1 is a longitudinal vertical section, partly in detail, of one form of mold embodying my invention. Fig. 2 is a view of one end of the segmental collapsible core. Fig. 3 is a section taken on the lines II—II of Fig. 2. Fig. 4 is a detail side view of three of the segments of the collapsible core, and Fig. 5 is a detail side view of one of the other segments of the core.

The mold or device 10 has a die, or shell 11 composed of two mating members, or plates 12 and 13 which may be made in any suitable shape, or size. A portion of the opposed faces of each of the mating members, or plates 12 and 13 are cut-out, or recessed, at 14 and 15, in a form of the configuration of the article to be molded when said members are disposed in mating arrangement, as in Fig. 1 which shows a doll head and its neck. One end of each of the mating members 12 and 13 is also cut-cut whereby a passage 16 is provided through the wall of the die, and which communicates with the recess so as to removably hold therein the collapsible core 17 which serves to form the hollow interior of the article to be molded. In order to hold the core 17 when positioned between the mating members, upon the end of the member 13, and adjacent to the passage 16, is a plate 17ª which is connected to said member by one or more screws, or bolts 17ᵇ which are adapted to permit the plate to be adjusted back and forth as required.

The core 17 comprises a plurality of segments, preferably eight in number, as 18, 19, 20, 21, 22, 23, 24, 25. Each of the segments 18, 19, 20, 21, has an enlarged part 26 of the shape of an irregular triangle as viewed transversely whereby two right-angle straight faces 27, 28 and an irregularly curved face 29 are provided. Each of the segments 22, 23, 24, 25 also has an enlarged part 30 having two parallel straight side faces 32 and 33 and an irregularly curved face 34. Integrally formed upon one end of the enlarged part of each of the segments is a stem 35 which is exteriorly threaded, at 35ª, so that when the segments are assembled a uniform right and left thread will be provided. The corner of the straight faces of each of the segments 18, 19, 20, 21 and the corresponding part of each of the stems 35 thereof are similarly cut-out, and the face of each of the segments 22, 23, 24, 25 which is opposite to the curved face 34 as well as the face of the stem thereof opposite to the threads 35ª are also similarly cut-out whereby a passage 36 is provided centrally between all of the segments and the stems when assembled. For the purpose of supporting all of the segments when assembled in the passage 36 is an adjustable core-rod 37.

The core-rod 37 is considerably longer than the segments and stems of the core so that one end of it, as 37ª, may serve as a handle for conveniently manipulating the core 17. Adjacent to the handle 37ª the core-rod 37 is threaded, at 37ᵇ, and serving as a means to adjust said core-rod as occasion requires is an adjustable element, or sleeve 38. The sleeve 38 is interiorly threaded, at 39, and a portion of the wall of said sleeve is thicker than the other portion whereby large and small communicating passages 40 and 41 are formed. When the segments and the stems are assembled upon the core-rod 17 the threads of the wall of the passage 40 of the sleeve will engage the threaded portions 35ª of the stems of the segments, and the threads of the wall of the passage 41 will engage the threads 37ᵇ of the core-rod. Thus by rotating the sleeve 38 the segments and stems may be suitably adjusted upon the core-rod 17, or by rotating the handle of the core-rod its end between the segments may be moved inwardly or outwardly of the passage between said segments.

In operating the mold for making a hollow article, or a doll head, a suitable quantity of the plastic material is placed in the recesses 14 and 15 of the mating members, or plates 12 and 13. The collapsible core, when its parts are assembled, is disposed between the layers of the plastic material so as to be centrally of the recess of the die and one of the edges of the sleeve 38 will abut against the plate 17ª when the members are arranged in mating order. During the hardening process of the plastic material the mold is subjected to a heavy pressure to overcome the expansion arising during setting of the plastic material and which tends to force the core outwardly from between the members notwithstanding the resistance which is met by contact with the sleeve 38 and the retaining plate 17ª. Should the core move under the force of the pressure to some extent there will be a variation in the thickness of the wall of the article being molded, and to equalize the thickness of the wall the segments and stems may be suitably moved upon the core-rod by rotating the sleeve 38, or the core-rod 37 may be adjusted independently by rotating its handle 37ª. After the article is formed the core-rod and the sleeve are rotated so as to be released from engagement with the stems of the segments for withdrawal from the passage therebetween.

One of the segments 22, 23, 24, 25 is extracted from the article, and the remaining segments will collapse and may be removed in like manner.

In the foregoing description I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope thereof.

Having thus described my invention, I claim as new and desire to secure by Letters Patent:—

1. In a device of the character described the combination with a mold composed of two separable mating parts, each part being recessed to conform to the configuration of the object to be molded, of a core composed of a plurality of segments, a number of which have correspondingly triangular faces and one or more being formed with straight parallel side faces so as to permit all of the segments to be arranged circumferentially, a plurality of stems, each having one of its ends formed upon the corresponding end of each of the segments and all of the segments and said stems having the corresponding edges thereof cut-out whereby a passage will be provided through the core when the segments and the stems are assembled, said stems being exteriorly formed so that a cylindrical extension will be provided when the segments are concentrically arranged, a cylindrical core-rod movably disposed in the passage and a cylindrical sleeve serving to removably hold the ends of the segments to the core-rod and adapted to engage said cylindrical extension and the core-rod, whereby said segments and the core-rod will be adjusted in relation to each other, and the core suitably supported in the mold by the impingement of said sleeve against the walls of the opening of the mold communicating with the recesses within the mold, and a plate secured by a removable screw to the frame of the mold, and adapted for engaging the said sleeve whereby the sleeve and said core are retained in proper position.

2. In a device of the character described, the combination with a mold, composed of two independent separable mating parts, each part being recessed to conform with the configuration of the article to be molded and having a semi-cylindrical extension to each recess communicating with the end of the part, whereby a cylindrical passage is provided in one end of said mold to communicate with the recess thereof, of a core of less size than the interior of the mold, said core being composed of a plurality of alternately arranged irregular quadrangular and rectangular segments, each having a segmental portion removed from one face thereof, whereby said segments may be assembled in compact form circumferentially around a core rod, each segment having also an extension upon one of its ends, adapted to serve as a stem for securing the segments to the core-rod, said core-rod having a threaded portion adapted to receive an interiorly threaded sleeve, said sleeve having an interiorly threaded portion of larger diameter than the portion that engages the core-rod, said interiorly threaded portion being adapted for engagement with threads provided upon the ends of the stems of said segmental core, whereby the said core is secured in assembled relation around the core-rod, and a bracket removably and adjustably secured upon the outer surface of the end wall of the mold adjacent to the cylindrical passage whereby the core-rod and segmental core may be secured in position within the mold by the engagement of said cylindrical sleeve by said bracket, substantially as shown and described.

This specification signed and witnessed this twelfth day of June A. D. 1912.

LOUIS LEVINE.

Witnesses:
ROBT. B. ABBOTT,
M. DERMODY.